United States Patent [19]

Merkl

[11] 4,117,088

[45] Sep. 26, 1978

[54] HYDROPHOSPHIDE-GROUP CONTAINING MULTI-METAL INORGANIC POLYMERIC COMPLEX AND METHOD OF MAKING SAME

[76] Inventor: George G. Merkl, 46 Sunset Ct., Haworth, N.J. 07651

[21] Appl. No.: 758,345

[22] Filed: Jan. 10, 1977

[51] Int. Cl.$^2$ .................... C01B 25/00; C01B 15/16; C01B 25/26

[52] U.S. Cl. .................................. 423/299; 423/305; 204/DIG. 2

[58] Field of Search ............... 423/299, 305, 306, 307

[56] References Cited

U.S. PATENT DOCUMENTS

| | | | |
|---|---|---|---|
| 2,964,379 | 12/1960 | Teach et al. | 423/299 |
| 3,397,038 | 8/1968 | Minklei et al. | 423/299 |

OTHER PUBLICATIONS

Corbridge et al., Topics in Phosphorus Chemistry, vol. 3, p. 93, (1966).
The Structural Chemistry of Phosphorus, Corbridge, 1974, pp. 271-272.

*Primary Examiner*—O. R. Vertiz
*Assistant Examiner*—Gregory A. Heller

[57] ABSTRACT

Novel water-soluble inorganic multi-metal polymeric complexes are obtained by reacting, in the presence of water, at least one non-alkaline metal selected from Groups I to VIII of the Periodic Table with an alkali metal hydroxide and a phosphorus-containing compound which is capable of providing active hydrophosphide groups to the reaction under the conditions prevailing in the aqueous reaction medium. In one embodiment, an excess of the non-alkaline metal or metals is introduced into a reaction vessel, already containing an aqueous solution of a phosphorus-containing acid, and the alkali metal hydroxide is thereafter incrementally added. In another embodiment, carried out under high pH conditions, the alkali metal hydroxide and phosphorus-containing compound are each incrementally added to the reaction medium. The inorganic multi-metal polymeric complexes produced by this reaction are uniquely characterized by their ready solubility in water to produce transparent, viscous solutions which have valuable utility in the plating of metals and the precipitation of high purity metals and metallic pigments from the aqueous solutions.

17 Claims, 10 Drawing Figures

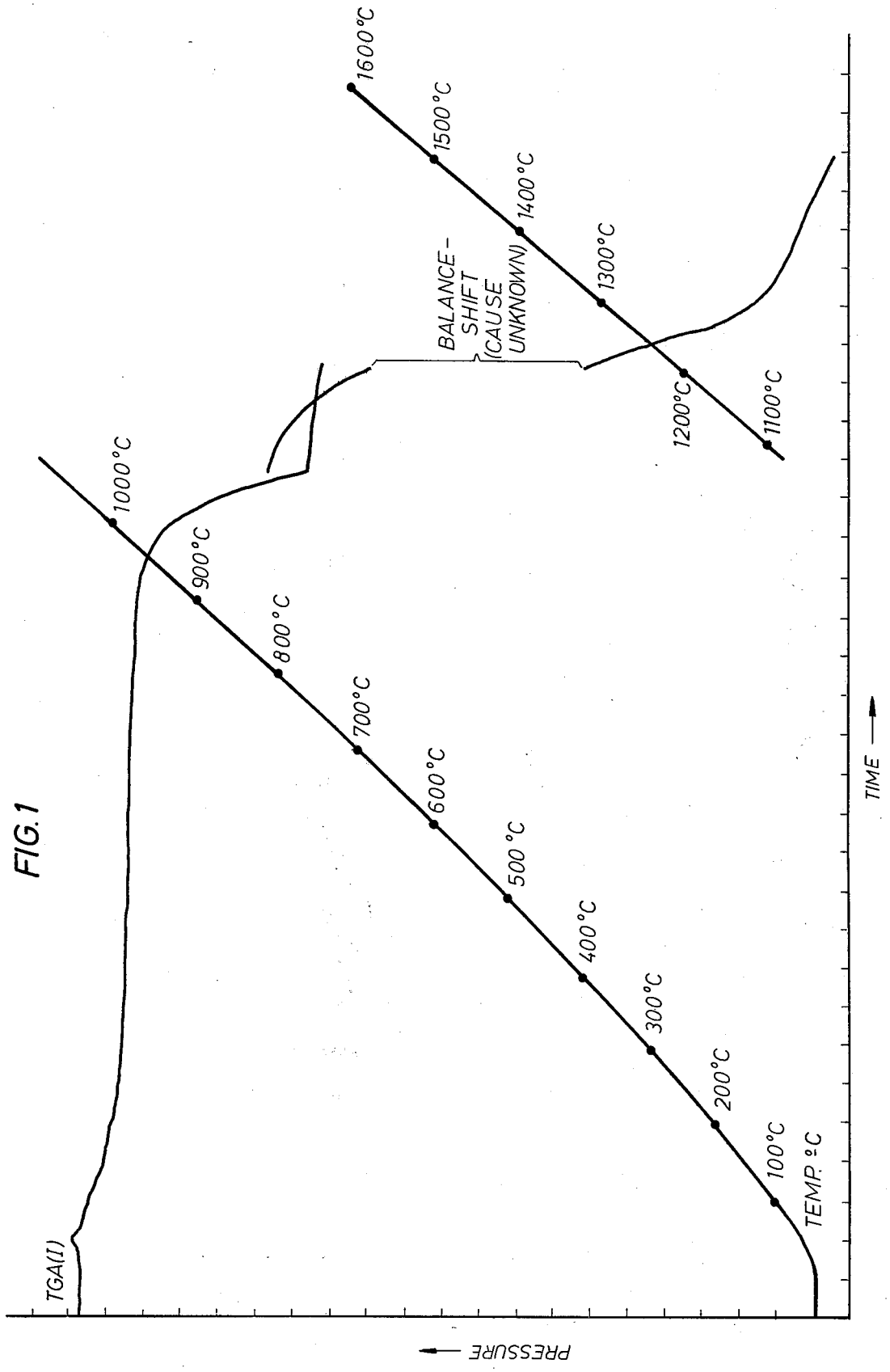

HYDROPHOSPHIDE-GROUP CONTAINING MULTI-METAL INORGANIC POLYMERIC COMPLEX AND METHOD OF MAKING SAME

SUMMARY OF THE INVENTION

The present invention is directed to methods for the production of heretofore unknown inorganic multi-metal polymeric complexes containing a plurality of hydrophosphide groups and to the aqueous solutions containing the same.

In accordance with the present invention, the inorganic multi-metal polymeric complexes containing a plurality of hydrophosphide groups can be prepared, either through an alkaline reaction or acidic reaction. The particular reaction which is selected will depend primarily upon the metal system employed, specifically whether the non-alkaline metal utilized in the method is one which dissolves more readily in an alkaline or acidic environment. Where the particular metal does not dictate the use of one or the other reaction, it is preferred in accordance with the present invention to carry out the reaction in an acidic environment.

The essential reactants to produce the inorganic multimetal polymeric complexes containing a plurality of hydrophosphide groups are: at least one non-alkaline metal of Group I-VIII of the Periodic Table, an alkali metal hydroxide; and a phosphorus-containing compound which is capable of conversion to produce reactive hydrophosphide groups under the conditions prevailing in the aqueous reaction medium. While this last reactant can be broadly selected from a variety of phosphorus-containing compounds, preferred phosphorus-containing compounds are phosphoric acid, $PH_3$, $P_2O_5$ any mixtures thereof, preferably a mixture of phosphoric acid and $PH_3$. Accordingly, the expression "phosphorus-containing compound capable of conversion to provide reactive hydrophosphide groups under the conditions prevailing in the aqueous reaction medium" is meant to embrace any or all of the above and similar phosphorus-containing compounds, the mechanism for conversion to the hydrophosphide groups and the utilization thereof in the production of the multimetal inorganic polymeric complexes of the present invention being explained hereinafter.

In the preferred embodiment of the present invention, wherein the reaction is carried out in an acidic reaction medium, a predetermined quantity of the non-alkaline metal is first introduced into a reaction vessel containing the aqueous reaction medium. A supply of phosphorus-containing compound, e.g., phosphoric acid is provided in the aqueous medium to produce an acidic environment for carrying out the reaction, preferably a pH in the aqueous reaction medium of up to about pH 2. The alkali metal hydroxide is thereafter incrementally introduced into the reaction medium, in such a manner as to promote the conversion of the phosphorus-containing compound to hydrophosphide groups which react with dissolved metal ions of the non-alkaline metal and alkali metal to produce the polymeric complex of the present invention. The rate of such incremental introduction of the alkali metal hydroxide should be slow, ideally corresponding approximately proportionally to the rate of dissolution of the non-alkaline metal such that the observed slow increase in the pH of the reaction medium will arise primarily from the formation of hydrophosphide groups and their combining with the multi-metal complex of non-alkaline metal and alkali metal, rather than from neutralization of the acidic reaction medium through the formation of salts.

Preferably, in accordance with this embodiment of the present invention, the incremental introduction of the alkali metal hydroxide is stopped when the overall pH of the aqueous medium reaches a pH of from about 3 to about 4. The reaction is stopped and the desired product recovered in the form of an aqueous solution of the inorganic polymeric complex by removing any unreacted non-alkaline metal when the pH of the aqueous medium reaches a pH of about 6.0 to about 7.0.

In the alternative embodiment of the present invention, carried out in a basic environment, the phosphorus-containing compound is incrementally introduced into an aqueous reaction medium containing the non-alkaline metal and dissolved alkali metal hydroxide. In this embodiment, it is also possible to simultaneously add both the alkali metal hydroxide and the phosphorus-containing compound in incremental fashion to the aqueous reaction medium. In accordance with this embodiment, the reaction medium should initially be highly alkaline, preferably at a pH above 11. The phosphorus-containing compound, as it is added to the reaction medium, is converted under the conditions prevailing to hydrophosphide groups which react with dissolved ions of the non-alkaline metal and alkali metal. This results in the production of the inorganic multimetal polymeric complex containing a plurality of hydrophosphide groups in accordance with the present invention. The incremental introduction of the phosphorus-containing compound effects a slow lowering of the pH, such incremental introduction being stopped when the pH reaches about 8.5 to 10.5. The reaction is terminated by removal of all unreacted non-alkaline metal when the pH of the aqueous medium reaches a pH of about 6.0 to about 7.5.

The method of the present invention for the production of the inorganic polymeric complexes is basically exothermic in nature and, with some reactant combinations, can be carried out under ambient conditions of temperature and pressure. It is preferred, however, to maintain the temperature of the reaction within the range of about 50° C to about 300° C. Also, depending on the particular non-alkaline metal, more effective production of the inorganic polymeric complex can ordinarily be achieved by carrying out the reaction under slightly elevated pressures. In some circumstances, it may be desirable to agitate the reaction vessel to achieve the greatest contact between reactants in the production of the inorganic polymeric complex.

Adequate and effective contact between the phosphorus-containing compound and the dissolving non-alkaline metal is one important parameter necessary to assure effective production of the inorganic polymeric complex. Where the phosphorus-containing compound is a gas, for example, this can be effectively achieved by bubbling such gaseous reactant directly into the aqueous reaction medium so that the gas bubbles emerge in the vicinity of the non-alkaline metal, most preferably, to impinge directly upon the non-alkaline metal present in the aqueous reaction medium.

In the acidic embodiment of the reaction, where the alkali metal hydroxide is incrementally added to the reaction medium, particularly as solid pellets, it should be added so as to create localized areas of high pH in the vicinity of the non-alkaline metal in order to assist in the dissolution of the non-alkaline metal and the production of hydrophosphide groups (which normally cannot be produced in acidic solutions).

When phosphoric acid is employed as the phosphorus-containing compound, the phosphoric acid introduces oxygen into the aqueous reaction medium in the form of phosphate and related ions, which have a tendency to counteract the production of the inorganic polymeric complexes and cause undesirable salt formation. Accordingly, it is preferred when utilizing phosphoric acid to conjointly utilize $PH_3$ gas. It is theorized that the presence of the $PH_3$ within the aqueous reaction medium assists in the removal of oxygen present in the system by promoting the formation of water molecules. Of course, as indicated previously, $PH_3$ can be utilized alone as the phosphorus-containing compound in the production of the inorganic polymeric complexes of the present invention. In addition, as will be explained hereinafter, when aluminum is employed as the non-alkaline metal, a specified activated form of aluminum can be employed, which activated form of aluminum also tends to reduce the available oxygen and substantially reduce the degree of salt formation which might otherwise occur.

Those skilled in the art will appreciate that some non-alkaline metals of Groups I-VIII of the Periodic Table will naturally dissolve in the aqueous acidic or alkaline medium. As to these metals, the above described process proceeds, although sometimes slowly, without the application of external sources for promoting the reaction. However, where the particular metal utilized does not dissolve easily in the reaction medium, it may be desirable to promote the reaction in one or more ways. It has been demonstrated that the reaction rate can be increased by such means as heating the reaction medium, increasing the effective surface area of the non-alkaline metal or metals, and electrically depolarizing the surface area of the non-alkaline metal so as to increase hydroxyl attack and dissolution of the metal.

In the preferred embodiment of the invention, wherein a phosphoric acid solution is employed as the reaction medium, it is preferred to carry out the reaction at a temperature of about 50° C, to 300° C, this having the effect of accelerating dissolution of the non-alkaline metal, thus facilitating the complex formation reaction.

The hydrophosphide group containing multi-metal inorganic polymeric complexes of the present invention can be utilized in a variety of ways. It has been determined in accordance with the present invention that the aqueous solutions of the inorganic polymeric complexes can be effectively employed in the plating of metals. Such aqueous solutions also find utility in the precipitation of high purity metals and metal pigments.

BRIEF DESCRIPTION OF THE DRAWINGS

FIG. 1 is a thermogravimetric analysis thermograph made of a titanium-sodium-phosphorus polymer produced by the practice of the present invention;

DESCRIPTION OF PREFERRED EMBODIMENTS

Figure 2A:
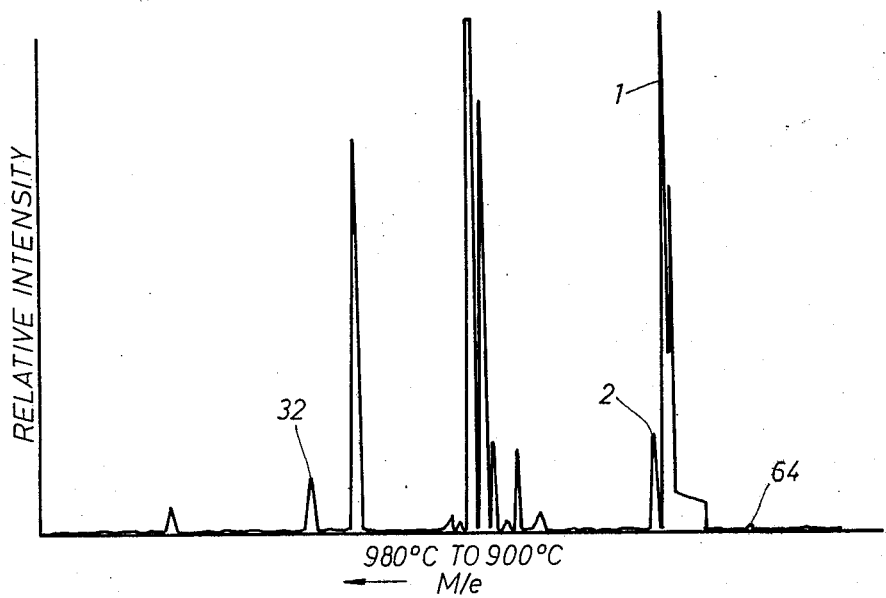
FIGS. 2 (A–C) are portions of a mass spectrograph scan of the polymeric complex of FIG. 1 made at the time of the thermogravimetric analysis depicted in FIG. 1.

The method of the present invention for the production of the inorganic polymeric complex is carried out totally in an aqueous reaction medium. As a result, the inorganic polymeric complex is produced as an aqueous solution. For most applications, it will be unnecessary to separate the complex polymeric product from the aqueous solution. This is because the important utilities contemplated for the products of the present invention, for example, as metal plating solutions are contemplated for use in aqueous solution form.

To prepare the inorganic polymeric complex of the present invention the following reactants are required:
(a) at least one non-alkaline metal selected from Groups I-VIII of the Periodic Table;
(b) an alkali metal hydroxide; and
(c) a phosphorus-containing compound which is capable of conversion to hydrophosphide groups under the conditions prevailing in the aqueous reaction medium.

These reactants are individually discussed below.

The Non-Alkaline Metal

In the method of the present invention, the metal reactant may be any non-alkaline metal of Groups I-VIII of the Periodic Table. Representative, non-limiting examples of applicable non-alkaline metals include:

Group I-B     copper, silver, gold
Group II-A    beryllium, magnesium
Group II-B    zinc, cadmium
Group III-A   aluminum, gallium, indium
Group IV-A    silicon, tin, lead
Group IV-B    titanium, zirconium, hafnium
Group V-A     antimony, bismuth
Group V-B     vanadium, niobium, tantalum
Group VI-A    selenium, tellurium
Group VI-B    chromium, molybdenum, tungsten
Group VII-B   manganese
Group VIII    iron, cobalt, nickel, palladium rhodium It should be recognized that while silicon, as a member of Group IV-A, is not generally defined as a metallic element, silicon acts in the method of the present invention as a non-alkaline metal. Accordingly, the expression "non-alkaline metal of Groups I-VIII of the Periodic Table" is meant to embrace any and all of the above and equivalent metals, including silicon. As will be further recognized, the term "non-alkaline metal of Groups I-VIII of the Periodic Table" does not embrace the alkali metals of Group I-A. The alkaline earth metals, calcium, strontium, and barium of Group II-A, are similarly not within the scope of the term. On the other hand, beryllium and magnesium of Group II-A can be applicably employed in the practice of this invention and these metals also fall within the scope of the expression "non-alkaline metal of Groups I-VIII of the Periodic Table" as used throughout this specification.

In addition to a single non-alkaline metal, as defined above, the metal reactant of the present invention can advantageously comprise two or more such non-alkaline metals. As indicated previously, non-alkaline metals applicable include not only those metals of Groups I-VIII of the Periodic Table which can be dissolved either in the aqueous alkaline solution or acidic solution, or in either environment in the presence of the phosphorus-containing compound.

In broad terms, it may be stated that the reaction dynamics are related to the available surface area of the non-alkaline metal. Where the non-alkaline metal is in the form of extremely large chunks, there may be insufficient surface area per unit weight of non-alkaline metal for adequate dissolution and reaction in accordance with the method of the present invention. Where the metal dissolves slowly and is difficult to react, it is often advisable to increase the reactivity of the metal by increasing the available surface area, such as by decreasing the particle size of the non-alkaline metal. Care must be taken, however, not to provide a particle size which is sufficiently reactive that dissolution takes place too rapidly. On the other hand, with some metals, a decrease in the particle size of the non-alkaline metal can actually decrease the reaction dynamics. This latter effect appears to occur due to polarization between the metal particles, not only at the surface of the particulate metal but also within the mass of metal particles. This has the effect of reducing the available hydrogen for metal dissolution.

When aluminum is employed as the non-alkaline metal, an activated aluminum can also be used to form the inorganic, polymeric complex of the present invention. As used herein, activated aluminum means an aluminum, of at least 99.9% purity, that has been activated with mercury, gallium, or an alloy of gallium and indium in the presence of a source of $H^+$ ions. Such activated aluminum, and the procedure for making same, are fully and completely disclosed in Applicant's U.S. Pat. No. 3,993,595 issued Nov. 23, 1976, such patent being incorporated herein by reference for all purposes.

When using the activated aluminum it is preferred, according to the present invention, to use aluminum activated with mercury.

For any particular non-alkaline metal or combination of non-alkaline metals or activated aluminum, the selection of size and/or shape of the metallic pieces can be easily determined by one skilled in the art, based upon an observation of reaction dynamics. In general, however, on a laboratory scale it has been found that a particle size of from about ⅛ inch to 1 inch in diameter for non-alkaline metal shot or sponge is particularly effective in achieving the advantageous results of the present invention. Of course, the method of the present invention can be carried out with equal efficiency using wire, foils, rods or other convenient forms and shapes (including powders which can be used if care is taken to control the reaction).

The Alkali Metal Hydroxide

The alkali metal hydroxide utilized as the second reactant in the method of the present invention can comprise any hydroxide of a metal of Group I-A of the Periodic Table, principally, sodium hydroxide, potassium hydroxide or lithium hydroxide. As will be explained in more detail hereinafter in connection with the discussion of reaction parameters, the alkali metal ions supplied to the reaction medium by the hydroxide enter into reaction and form a component of the inorganic polymeric complex produced by the reaction.

With respect to those non-alkaline metals which dissolve in an alkaline environment, it should be clear that the alkali metal hydroxide assists in dissolution of these metals. In addition, however, even when considering the reaction which is carried out in the acidic environment the alkali metal hydroxide by incorporation into the structure of the inorganic polymeric complex adds strength and stability to the hydrophosphide group containing inorganic multi-metal polymeric complex, which strength and stability could not be achieved absent the presence of the alkali metal and non-alkaline metal within the polymeric complex structure.

While not favored in the practice of the method of the present invention, it should be recognized that under certain circumstances all or a portion of the alkali metal hydroxide may be replaced with one of the alkaline earth metal hydroxides. The alkali metal hydroxide, specifically sodium hydroxide or potassium hydroxide, is preferably employed in the form of a prepared aqueous solution of the alkali metal hydroxide. However, it is possible, where the alkali metal hydroxide is metered into the reaction system, to employ solid pellets of the alkali metal hydroxide.

The Phosphorus-Containing Compound

Analytical studies have shown that the inorganic polymeric complex produced in the method of the present invention contains a plurality of hydrophosphide groups. Accordingly, the third essential reactant in the method of the present invention comprises a phosphorus-containing compound which, under the conditions prevailing in the reaction medium, is converted to such hydrophosphide groups.

In the preferred reaction process, the phosphorus-containing compound is chosen from phosphoric acid, $PH_3$, $P_2O_5$, and mixtures thereof. As indicated previously, however, other equivalent forms of phosphorus-containing compounds are applicable in accordance with the present invention.

Reaction Parameters

Reactant Proportions

In the production of the inorganic polymeric complex of the present invention, the ratio of the alkali metal to the non-alkaline metal can be varied within wide limits. For example, such ratio may be varied from about 1:0.5 to 1:10 or more, this ratio being directly porportional to the effective surface area of the non-alkaline metal. For example, where a great surface area exists and there is substantial dissolution of the non-alkaline metal, there will be a greater ratio of non-alkaline metal to alkali metal in the inorganic polymeric complex. Likewise, the amount of alkali metal when compared with the non-alkaline metal will be greater where a small surface area of the non-alkaline metal exists, and as a result, the dissolution rate is less.

Generally, in accordance with the present invention, the non-alkaline metal is employed in an amount in excess based on the desired molar ratio of alkali metal to non-alkaline metal in the inorganic polymeric complex.

Since the formation of the inorganic polymeric complex requires the presence of non-alkaline metal for reaction, the reaction can be terminated conveniently at any stage by simply removing the excess non-alkaline metal from the reaction medium.

As will be explained in greater detail hereinafter, the amount of the phosphorus-containing compound employed in the method of the present invention will generally be predetermined based upon the particular alkali and non-alkaline metals utilized. It has been determined that in the inorganic polymeric complex formed in accordance with the present invention, the non-alkaline metal ideally takes its lowest possible valence state (if in fact more than one valence state is possible). It is further believed that in the inorganic polymeric complex of the present invention the number of hydrophosphide groups is ideally equal to the sum of the valences of the alkali metal and non-alkaline metal. From this, therefore, it is possible to determine the amount of the phosphorus-containing compound to be introduced into the reaction medium. It is generally desirable to include within the reaction medium an excess amount of the phosphorus-containing compound based upon the proposed formulation. This will assure that sufficient hydrophosphide groups will be present to react with the alkali metal and non-alkaline metal in the formation of the inorganic polymeric complexes of the present invention.

Reaction Dymanics

The reaction dynamics of the method of the present invention will be described primarily with regard to a model system based upon silicon/sodium or potassium. It should be recognized, however, that the reaction dynamics set forth will be typical of a substantial number of the non-alkaline metals of Groups I-VIII of the Periodic Table encompassed within the description given above. The reaction dynamics for any particular metal system or combination of metals can be easily determined by one of ordinary skill in the art through routine experimentation.

In the acidic medium embodiment of the present invention, in both the silicon/sodium and silicon/potassium system, the silicon metal does not readily dissolve in the acidic environment. However, upon the introduction into the reaction vessel of the alkali metal hydroxide creating localized areas of high pH in the vicinity of the silicon metal, dissolution of the silicon metal takes place effectively. With less reactive metals than silicon, it may be necessary, in order to either initiate, accelerate or maintain the reaction, to provide external heating of the reation medium. This heating should be carried out in a uniform manner. Heating of the reaction medium to a temperature of at least about 50° C to about 300° C will generally be satisfactory to develop and accelerate the reaction thereby shortening the total reaction time.

In the alternative, there are other available procedures when utilizing a less reactive non-alkaline metal. For example, as has been explained earlier, since the reactivity of the non-alkaline metal is to some extent a function of the surface area of this non-alkaline metal, increased reactivity can be achieved by increasing the surface area of the non-alkaline metal. This can be done by providing the non-alkaline metal in smaller particle size or in greater amount. However, it should be recognized that care should be taken in utilizing a metal which is in powdered form. For some metals, the increased surface area will produce a reactivity which will be so great that the reaction can not be easily controlled. In other instances, there will be a tendency for a surface polarization to occur when powder is used. This retards the effective generation of hydrogen and results in the non-alkaline metal being even less reactive than would be expected.

Taking advantage of the fact that the method of the present invention is applicable to so many different metals, the reactivity of less reactive metals may be very effectively increased by including within the reaction system a minor amount of a more reactive metal. The presence of almost any second non-alkaline metal, even as an impurity in the first non-alkaline metal, seems to increase the reactivity of the non-alkaline metal through an anodic reaction. In this respect, it has been determined that even amounts as small as 0.01% of such more reactive metal will increase the reactivity of a less reactive non-alkaline metal. Of course, since more than one metal is applicable in accordance with the present invention, there is no upper limit in terms of the amount of the more active non-alkaline metal which can be added to the reaction medium.

When increasing the reactivity of a less reactive non-alkaline metal through the addition of a more reactive non-alkaline metal, it has been found advantageous to use as the more reactive metal a non-alkaline metal which has been previously used in a reaction carrying out the method of the present invention. That portion of the non-alkaline metal remaining after carrying removal from the reaction medium, is found to be even more reactive in carrying out further reactions. In fact, since even the less reactive non-alkaline metals become more reactive after being utilized in carrying out the method of the present invention, some of the less reactive non-alkaline metal which has been put through the instant method can be used to accelerate the reactivity of the same non-alkaline metal in future reactions. This procedure would eliminate the possibility of introducing an inputity into the organic polymer as a second metal, where no second metal is desired.

With respect to the alkali metal hydroxide, it is emphasized that in addition to the applicability of sodium hydroxide and potassium hydroxide, the process of the present invention is applicable as well to the other alkali metal hydroxides. In addition, as was also indicated previously, all or a portion of the alkali metal hydroxide may be replaced with an alkaline earth metal hydroxide, such as calcium, barium or strontium hydroxide. These alkaline earth metal hydroxides are however, less active than the illustrated metal hydroxides. Because of the rather low activity of these alkaline earth metal hydroxides, their use is not preferred.

In the acidic medium embodiment of the method of the present invention, a quantity of non-alkaline metal in excess of that anticipated to be used up in the reaction is first introduced into a reaction vessel containing an aqueous solution of a phosphorus-containing compound, such as phosphoric acid (preferably 85% $H_3PO_4$). An acidic environment is thus established, preferably one wherein the pH of the aqueous medium is below about pH 2.

The alkali metal hydroxide is next introduced into the reaction medium, slowly and in highly concentrated form, preferably by the incremental addition of small quantities of solid pellets. It is important in accordance with the present invention that care be taken to provide adequate contact between the reactants during this step. Particularly where the non-alkaline metal dissolves more readily in a highly alkaline environment than in an acidic environment, it is important to introduce the alkali metal hydroxide such that localized areas of high pH are created in the vicinity of the non-alkaline metal. This is readily accompanied by dropping the pellets of alkali metal hydroxide such that they fall directly on or near the undissolved non-alkaline metal at the bottom of the reaction vessel.

The dissolution of the non-alkaline metal which occurs either by action of the acid or the base is of course accompanied by release of agtomic hydrogen (protoms, which attach to the valence electrons of the non-alkaline metal). It is theorized according to the present invention that it is this atomic hydrogen which reacts with the phosphorus-containing compound, producing the hydrophosphide groups for introduction into the inorganic polymeric complex of the present invention. Thus, in the preferred embodiment of the present invention, the phosphorus-containing compound should be present in the reaction medium in an amount at least approximately equimolar in relation to the number of available valance electrons in the dissolving non-alkaline metal. Since some of this atmoic hydrogen can, of course, be lost in the form of $H_2$, it is generally necessary to introduce into the reaction system an excess amount of the phosphorus-containing compound, taking into consideration the numbder of valence electrons made available through the dissolution of the non-alkaline metal.

In connection with the acidic embodiment of this invention, the incremental introduction of the alkali metal hydroxide into the reaction medium will, of course, effect a gradual increase in the pH of the reaction medium. This gradual increase of the pH, however, is associated not only with a neutralization of the acidic reaction medium with the resultant formation of salts, but also with the reaction of the atomic hydrogen released by the dissolving non-alkaline metal and the phosphorus to form hydrophosphide groups, which appear to be stabilized and taken up into inorganic polymeric complex by the combined action of both the non-alkaline and the alkali metal ions. Since hydrophosphide groups do not ordinarily form in acidic media, it should be apparent that the manner in which the reactants are combined, particularly the alkali metal hydroxide addition, is of critical importance.

The introduction of the alkali metal hydroxide should be such that notwithstanding localized areas of high pH in the vicinity of the non-alkaline metal, the overall pH of the reaction medium is not abruptly increased, but rather increases over some prolonged period of time through the very slow additon of the alkali metal hydroxide. Such addition can be carried out over several hours or even several days in order to gradually increase the pH of the reaction medium.

In order to effectively produce the inorganic polymeric complex of the present invention, the incremental introduction of the alkali metal hydroxide is preferably stopped when the pH of the aqueous medium reaches a pH of from about 3 to about 4. At this stage, however, so long as there is any excess unreacted non-alkaline metal remaining, the formation of the inorganic polymeric complex will continue. In the preferred embodiment of the present invention, the reaction is allowed to continue for some period of time subsequent to termination of the introduction of the alkali metal hydroxide and the reaction is terminated by removing any unreacted non-alkaline metal from the aqueous medium when the pH of the aqueous medium reaches about pH 6 to about pH 7.

At some time after the addition of the alkali metal hydroxide, when the pH of the reaction medium reaches about pH 3.5-4.5, there appears to be a taking up of water by the inorganic polymeric complex being formed. This can be observed upon heating the reaction medium at this point up to about 300° C while observing the amount of water which is driven off through this heating. Surprisingly, very little water appears to be driven off, with the conclusion being that the water has somehow been tied-up or bound into the complex formed.

As indicated previously, in an alternative embodiment of the present invention, the reaction is carried out in an alkaline medium. In this embodiment, the alkali metal hydroxide and the phosphorus-containing compound may both be added incrementally, but essentially simultaneously, into the aqueous reaction medium containing the non-alkaline metal or the phosphorus-containing compound by itself may be incrementally added to an aqueous medium already made alkaline by prior addition of the alkali metal hydroxide.

When adding the alkali metal hydroxide incrementally together with phosphorus-containing compound, the alkali metal hydroxide can be in the form of an aqueous solution. Preferably, however, the alkali metal hydroxide is in the form of solid pellets of sodium hydroxide or potassium hydroxide. Like the phosphorus-containing compound, these solid pellets of alkali metal hydroxide should be added to the reaction system so that intimate contact between the alkali metal hydroxide and non-alkaline metal occurs. This again can be achieved by dropping the pellets into the aqueous reaction medium in the vicinity of the non-alkaline metal.

When the simultaneous feed of alkali metal hydroxide and phosphorus-containing compound is carried out in accordance with the present invention to produce the inorganic polymeric complex, the feeds of the alkali metal hydroxide and phosphorus-containing compound should be such as to maintain the pH of the reaction medium alkaline, preferably within the range of from about pH 11 to about pH 1.4.

The alkaline medium reaction in accordance with the present invention is preferably carried out by first dissolving the alkali metal hydroxide in the aqueous reaction medium and thereafter incrementally introducing the phosphorus-containing compound. The initial introduction of the alkali metal hydroxide creates in the aqueous medium a highly alkaline environment, i.e., a pH close to 14, but it is acceptable to start the reaction at any pH about 11. As was the case with the acidic reaction embodiment of the present invention, in this alkaline reaction embodiment the phosphorus-containing compound when introduced into the aqueous reaction medium is converted to hydrophosphide groups through reaction of the phosphorus with atomic hydrogen which is released in the dissolution of the nonalkaline metal. The hydrophosphide groups so formed then react with dissolved ions of the non-alkaline metal and alkali metal to produce the inorganic polymeric complex of the present invention.

In accordance with this alkaline reaction embodiment, upon the incremental introduction of the phosphorus-containing compound the pH of the reaction medium gradually lowers. As with the acidic embodiment of the invention, this phenomenon is not due solely to a neutralization of the hydroxide upon introduction of the acidic phosphorus-containing compound to produce salt, but due also to formation of the inorganic polymeric complex of the invention. The incremental introduction of the phosphorus-containing compound is preferably stopped when the pH of the aqueous reaction medium reaches a pH of about 8.5 to about 10.5. In the preferred method of carrying out this embodiment, the unreacted non-alkaline metal is not removed from the aqueous medium at this point, but is removed when the pH of the aqueous medium reaches a pH of about 6.5 to about 7.5.

As a general rule, the reaction to produce the inorganic polymeric complex of the present invention, regardless of which of the above methods is utilized, is exothermic in nature. Accordingly, as the reaction proceeds and the inorganic polymeric complex is formed, heat will begin to build up within the reaction medium. It is preferred in accordance with the present invention to maintain the reaction medium within a temperature range of from about 50° C to about 300° C. It may be necessary under certain circumstances to control the reaction by providing a suitable means for withdrawal of heat from the reaction medium. This can be successfully achieved, for example, by utilizing a simple ice bath, or the like. In other circumstances, most typically when utilizing the acidic reaction embodiment of the invention (which is preferred primarily due to convenience), external heat will have to be applied to the reaction in order to stimulate increased dissolution of the nonalkaline metal, many of which are not readily soluble in acid. Once the reaction has progressed, however, sufficient heat is generated within the system and external heating may be stopped.

CHEMICAL ANALYSIS OF THE POLYMERIC COMPLEXES OF THE PRESENT INVENTION

In order to further study the inorganic polymeric complexes produced by the practice of the present invention, typical complexes were subjected to thermogravimetric analysis (TGA), mass spectroscopy (MS) and infra-red analysis.

Referring to FIG. 1, which is a TGA thermograph of a titanium-sodium-phosphorus polymer produced by the practice of this invention, one notes three reactions occur during the heating process. These reactions are observed at 100° C, 900° C and 1100° C. Nearly as soon as heat was applied, the pressure in the system began increasing and the downward thrust in the sample-containing crucible of evolved gas caused an "apparent" weight gain on the TGA curve. This gas evolution is evidenced at the 100° C portion of the TGA curve. At 1200° C, an unexplained shift occurred.

Figure 2B:
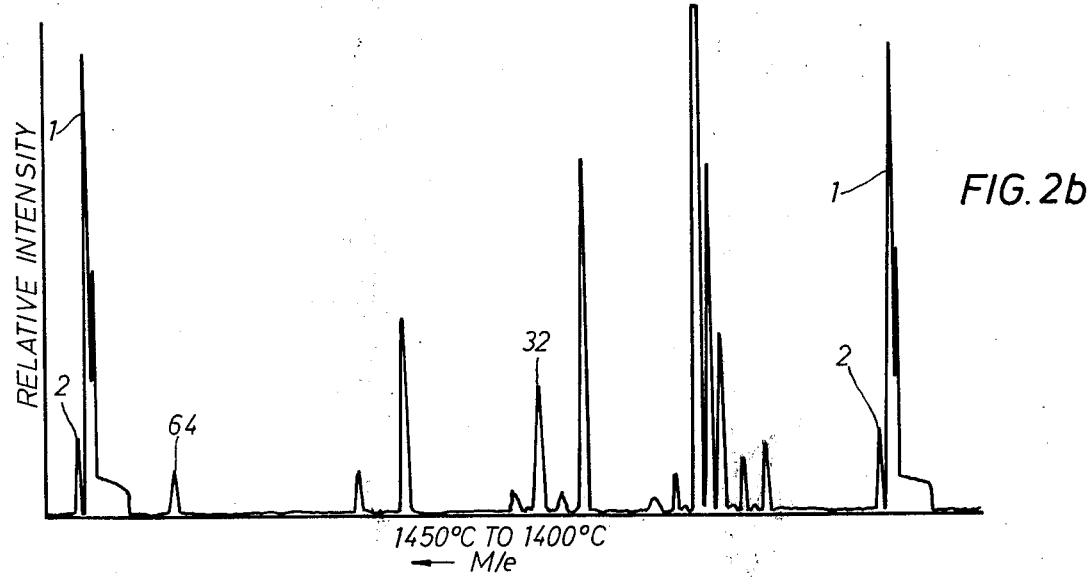
Figure 2C:
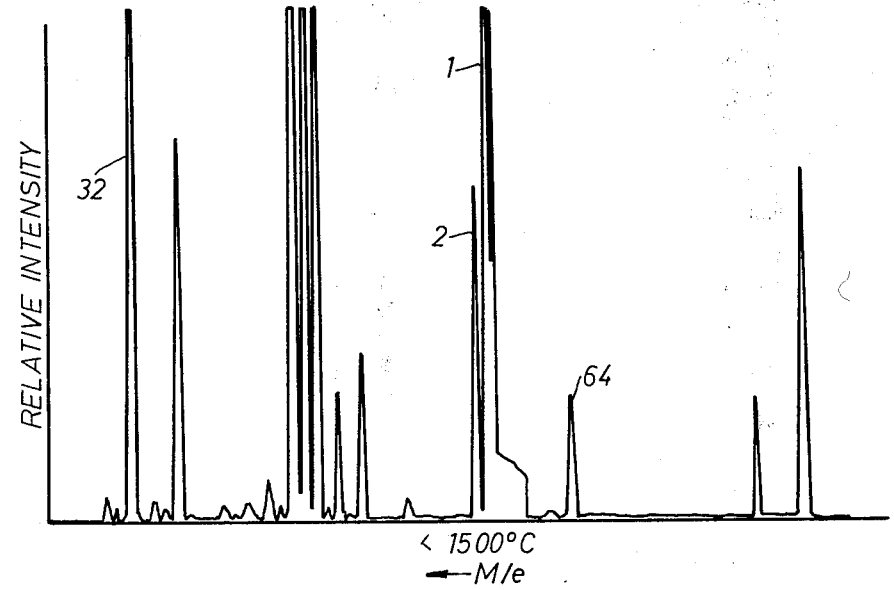
Figure 3:
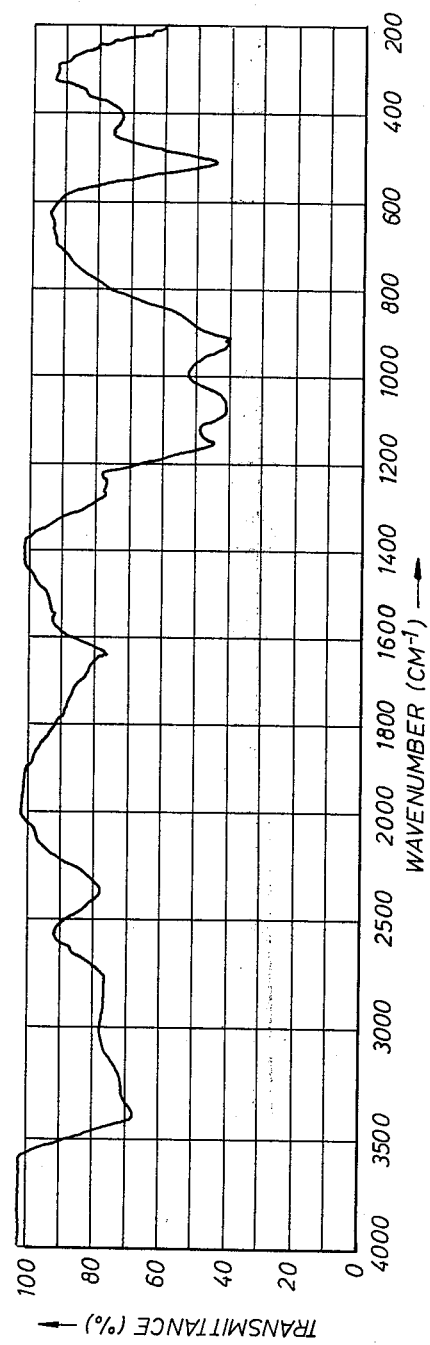
FIG. 3 is an infra-red scan of a tungsten-sodium-phosphorus polymeric complex produced by the practice of the present invention.
Figure 4:
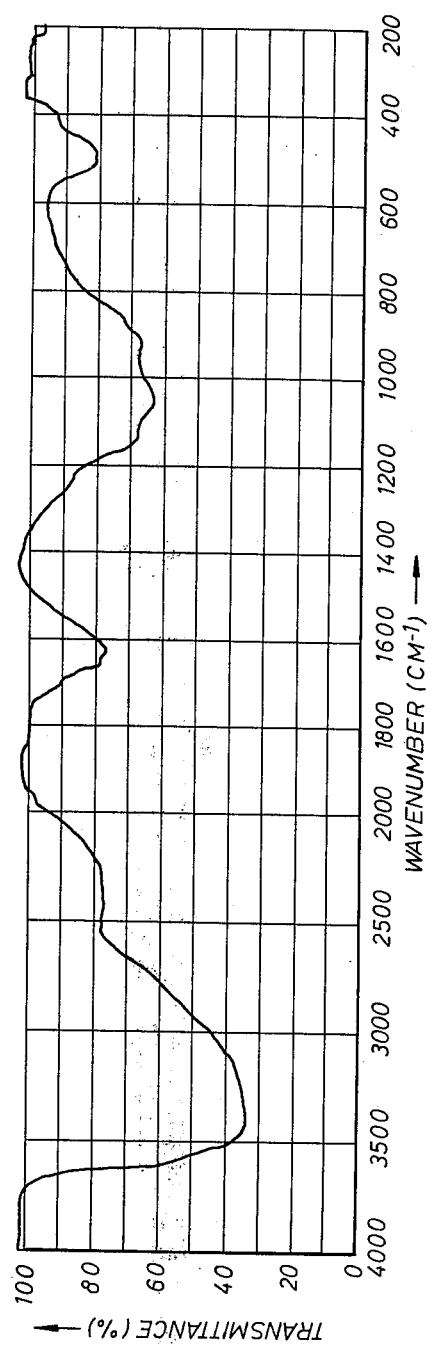
FIG. 4 is an infra-red scan of a molybdenum-sodium-phosphorus polymeric complex produced by the practice of the present invention.

The gases evolved from the sample during the TGA testing were channeled into a mass spectrograph. FIGS. 2A-C depict portions of the MS chart representing MS scans of 1 to 65 amu, of the gases evolved in the ranges approximating 900-980, 1400-1450 and greater, respectively.

MS results for the significant peaks involved are summerized as follows:

| M/e Peak | Temperature Range |
|---|---|
| 1 | 50- 450° C |
| 32 | 1290-1600° C |
| 4, 64 | 1220-1600° C |

The M/e peaks are interpreted to identify the various groupings and bonds which may be present in the inorganic polymeric complex of the present invention. For example, Mass 1 can be identified as hydrogen while mass 32 and 64 can be interpreted as various multiples of the hydrophosphide group, —HP—.

Based upon this interpretation of the MS chart and other analytical tests it has been hypothesized in accordance with the present invention that the formula of the inorganic polymeric complex can be emperically written as follows:

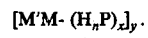

Wherein M represents the non-alkaline metal or metals; M' represents the alkali metal; n is an integer representative of the number of hydrogen atoms present for each phosphorus atom in the hydrophosphide group, inclusive of hydrogen which is present in hydride form; x is an integer representing the number of hydrophosphide groups present, ideally equal to the sum of the valences of M and M'; and y represents the number of repeating multi-metal hydrophosphide groups in the inorganic polymeric complex. While the value of y has not been quantified, it has nevertheless been determined that the present invention produces a polymeric complex by viscosity comparisons and by such characteristics as the film forming capabilities of the solutions containing the polymeric complex.

As indicated above, it has been analytically determined in accordance with the present invention through the above and subsequently described infrared analyses that in addition to hydrophosphide groups of varying hydrogen content, the inorganic polymeric complex of the present invention contains hydrogen, presumably in the form of a hydride, i.e., a hydride of the non-alkaline metal or alkali metal. In this regard, hydride formation appears to be most prevalent in the inorganic polymeric complex of the present invention when the pH is 5 or higher. Also higher temperature conditions seem to effect the valence state of the phosphorus present in the hydrophosphide groups.

In addition to the foregoing, it should be recognized that due to the inevitable presence of some oxygen in the aqueous reaction medium the inorganic polymeric complex may further contain hydroxy groups and/or oxygen complexes with phosphorus such as phosphite and/or phosphate groups. These can be minimized, however by carrying out the process of the present invention under the ideal conditions enumerated above. It should be apparent, however, that no single formula can be presented for the inorganic polymeric complex of the present invention and, it is for this reason that the foregoing expression "inorganic polymeric complex" has been utilized to described the products of the present invention. Moreover, it should be recognized that the empirical formula above is merely hypothetical and there is no intention that applicant be bound thereto.

The present invention will now be described by reference to the following specific examples. It must be recognized that these examples are given only to demonstrate the practice and effectiveness of the invention. These examples are not meant to, and should not be construed to, limit the invention to the specific examples set forth herein. Rather, these examples merely show the results obtainable through the practice of this invention by one skilled in the art.

In the examples which follow, reference will be made to FIGS. 3 to 8 which are infrared scans of inorganic polymeric complexes produced in accordance with the present invention. In order to allow for interpretation of the infra-red scans which are presented, particular reference is made to the following wavelengths (cm$^{-1}$) for the P-H group:

$V_1$-2327
$V_2$-991-doublet
$V_3$-2421-shoulder
$V_4$-1121 –

The parts and percentages recited in the following examples refer to parts by weight and percentages by weight unless specifically provided otherwise.

EXAMPLES

EXAMPLE 1

A tungsten-phosphorus-sodium inorganic polymeric complex is formed in accordance with the following procedure: 750 g of tungsten metal in the form of chucks approximately one-eighth inch to one-half inch in cross-section are added to a 600 ml reaction vessel containing 2,137 ml. of an 85% by weight solution of $H_3PO_4$. The solution temperture was approximately 21° C and the pH was less than 1.0. Sodium hydroxide pellets were thereafter slowly metered into the reaction solution. The procedure was to add approximately one tablespoonful to the solution and wait until it dissolves before adding the next increment. A glass stirrer was used to help dissolve the sodium hydroxide. In this manner, 1,600 g of NaOH were added over approximately a four hour period. At one point, the addition has to be slowed down somewhat in order to permit the reaction temperature to return to room temperature. The reaction vessel was then slowly heated and the reaction mixture stirred until the temperature had risen to approximately 120° C, at which time the temperature was maintained constant for a period of approximately 2 days. On the beginning of the third day, the reaction mixture began to bubble furiously. After approximately 6 hours of continuous bubbling, with the reaction medium becoming more and more viscous, eventually a solid product was formed at the bottom of the reaction vessel. This product was milky white in appearance, but dissolved readily in 500 ml. of hot water. This solution was again slowly heated, this time to approximately 50° C and left overnight and through the next day at this temperature. The following day, it was transferred to the heating mantel and again heated, this time to approximately 110° C. It was continuously heated at this temperature for approximately 13 more hours, at which time the heat was turned off and a sample taken for analysis. An infra-red spectra representing the anaylsis of this sample is reproduced at FIG. 3.

EXAMPLE 2

In this example, approximately 2,111 g of molybdenum metal are placed in a reaction vessel containing one liter of an aqueous solution of 85% concentration by weight phosphoric acid. The molybdenum metal reacts slowly in the $H_3PO_4$ solution. Thereafter, some 400 g of sodium hydroxide in solid pellet form are slowly metered into the reaction vessel over approximately a 2-hour period. The molybdenum metal reaction rate increases slightly, but the reaction solution remains relatively undisturbed. At this point, the pH of the solution measures about 5.0. For the next twenty days, the reaction vessel is heated to approximately 100° C each morning, kept at that temperature all day and then allowed to cool at night. On the twenty-first day, the reaction is terminated by removing unreacted molybdneum from the reaction vessel. An inorganic polymeric complex containing approximately 12 g of molybdenum is produced in this example. Reference to the infra-red scan illustrated in FIG. 4 confirms the presence of PH groups.

EXAMPLE 3

Figure 5:
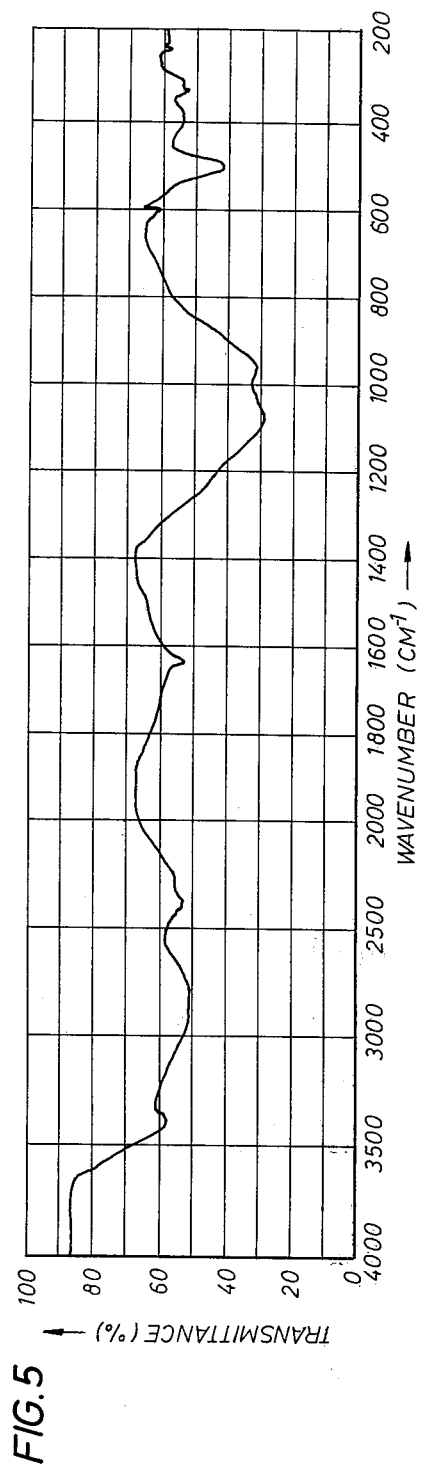
FIG. 5 is an infra-red scan of a titanium-sodium-phosphorus polymeric complex produced by the practice of the present invention, and similar to the polymeric complex analyzed in FIGS. 1 and 2.

A titanium-sodium-phosphorus inorganic polymeric complex is formed as follows. Some 240.8 g of titanium metal are placed in the reaction vessel, and thereafter, 267.2 ml. of $H_3PO_4$, diluted with water to form an 85% aqueous solution by weight, are placed into the reaction vessel. The titanium metal reacts with the $H_3PO_4$ solution. Next, 29.3 g of sodium hydroxide, in the form of pellets, are metered into the reaction vessel and 245 g of water are also added. The reaction continues undisturbed for some 54 hours, at which time the reaction solution is heated to a temperature of 90° C for 80 minutes. The transparent, viscous solution which results is thereafter dried to form a film and the infra-red scan illustrated in FIG. 5 is produced.

EXAMPLE 4

A total of 297.2 g of nickel metal is placed in a reaction vessel to which is added 267.2 ml of $H_3PO_4$ in the form of an aqueous solution with a concentration of 85% by weight. No visible reaction occurs between the nickel metal and the $H_3PO_4$ solution. Thereafter, 55.3 g of sodium hydroxide were metered into the reaction vessel along with 100 g of water. The nickel metal reacts slowly and the reaction continues undisturbed from some 26 days, after which time the reaction solution is heated to 100° C. The color of the reaction solution becomes lime green and a viscous solution of a nickel-sodium-phosphorus inorganic polymer is formed.

EXAMPLE 5

Following the procedures essentially as described above, 905 g of tantalum metal are placed into a reaction vessel. Next, 267.2 ml of $H_3PO_4$, mixed with sufficient water to produce an 85% by weight concentrated solution, are added to the reaction vessel. The tantalum metal does not react visibly with the $H_3PO_4$ solution. Thereafter, 50 g of sodium hydroxide, in the form of solid pellets, are metered into the reaction solution along with 200 ml of water. The reaction system remains undisturbed for some twenty-six days, after which time heat is applied to the reaction vessel to raise the temperature of the reaction solution to 100° C. The reaction is terminated by removing from the reaction vessel any unreacted tantalum metal. An inorganic polymer containing tantalum-sodium phosphorus is prepared in this example.

EXAMPLE 6

Figure 6:
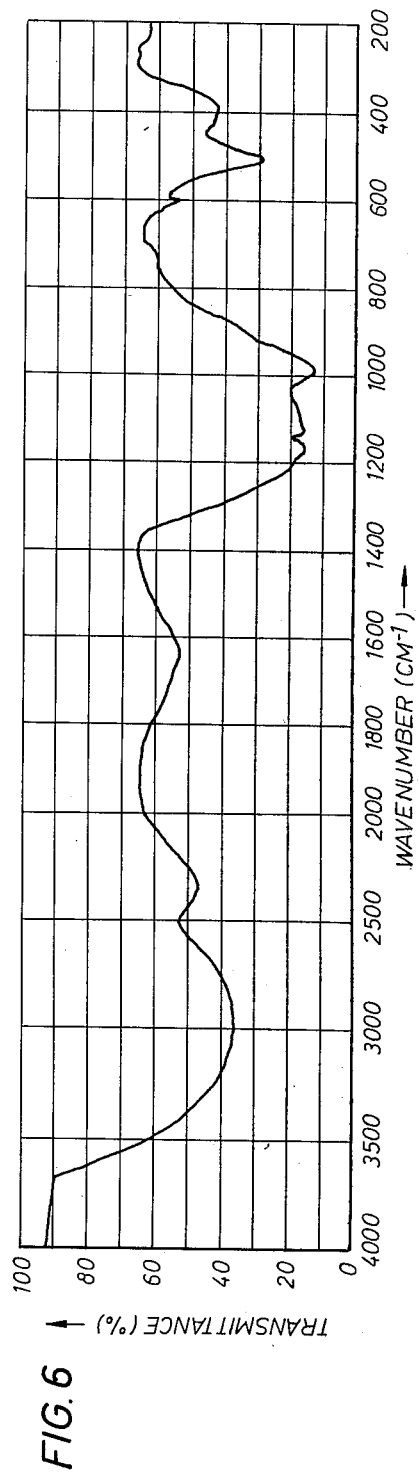
FIG. 6 is an infra-red scan of an aluminum-sodium-phosphorus polymeric complex produced by the practice of the present invention.

An aluminum-phosphorous-sodium inorganic polymer is formed as follows. Some 144.6 g of aluminum metal are added to the reaction vessel. Thereafter, 267,2 g of $H_3PO_4$, diluted with sufficient water to form an 85% $H_3PO_4$ solution by weight, is added to the reaction vessel. Next, 21 g of sodium hydroxide, in the form of solid pellets, are slowly metered into the reaction solution. 30 minutes after initiating the sodium hydroxide metering, the reaction solution temperature is 23° C. Some 245 g of water are added 50 minutes after beginning the sodium hydroxide metering to improve the solubility of the sodium hydroxide. The reaction solution remains undisturbed for approximately sixty-nine hours, at which time heat is applied to the reaction vessel to raise the temperature of the reaction solution to 52° C. Heating is discontinued after two hours and fifteen minutes when the reaction solution reaches 82° C; the reaction vessel thereafter remains undisturbed. A few days after initiation of the polymer-forming reaction of this example, the reaction is continuing and a sample is taken for analysis. Referring to FIG. 6, the presence of PH groups is demonstrated.

EXAMPLE 7

Following the procedures essentially as described above, an antimony-sodium-phosphorus inorganic polymer is formed in this example. Initially, 618 g of antimony metal are placed into a reaction vessel. Next, 267.2 ml of $H_3PO_4$ mixed with sufficient water to produce as 85% by weight concentrated solution are introduced into the reaction system. The antimony metal reacts extremely slowly in the $H_3PO_4$ solution. Thereafter, 40 g of sodium hydroxide in the form of solid pellets are metered into the reaction solution along with 100 ml of water. Reaction continues undisturbed for a total of 26 days, after which time heat is applied to the reaction vessel to increase the temperature of the reaction solution to 100° C. The reaction solution is terminated by removing unreacted antimony metal from the reaction solution. A polymer is formed from this example.

EXAMPLE 8

A copper-sodium-phosphorus inorganic polymeric complex is formed as follows. Some 80 g of copper metal are placed into a reaction vessel containing 267.2 ml of $H_3PO_4$ mixed with a sufficient quantity of water to produce an 80% by weight concentrated solution. No visible reaction occurs between the copper metal and the $H_3PO_4$ solution. Thereafter, 40 g of sodium hydroxide, in the form of solid pellets, are metered into the reaction vessel along with 200 ml of water. The copper metal reacts slowly. Reaction remains undistrubed for 30 days after which time heat is applied to the reaction solution for approximately 320 minutes. A polymer is formed by the procedure of this example.

Figure 7:
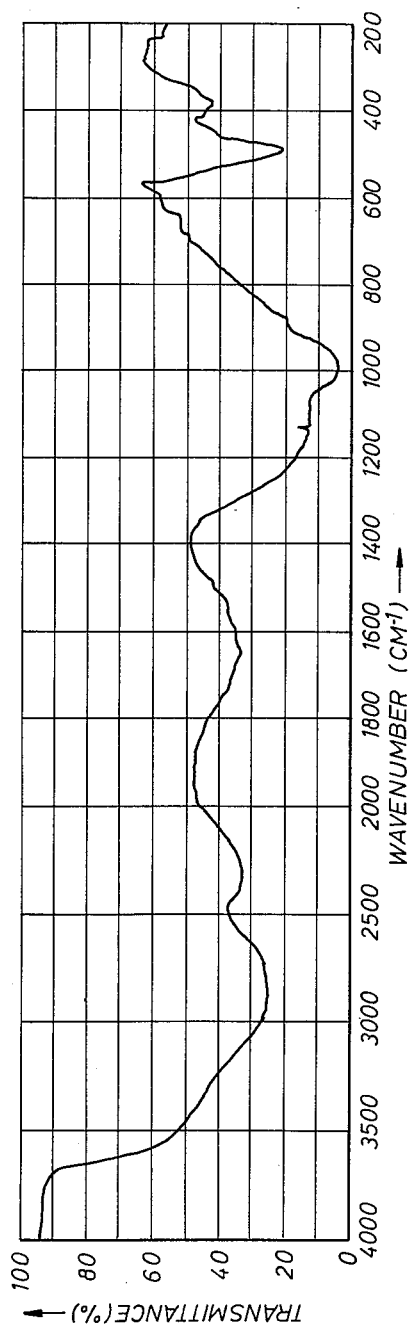
FIG. 7 is an infra-red scan of a copper-sodium-phosphorus polymeric complex produced by the practice of the present invention.

A sample of the inorganic polymeric complex is removed from the reaction vessel for IR scan. Referring to FIG. 7, the infra-red scan indicates the unique nature of the product formed.

EXAMPLE 9

A cobalt-sodium-phosphorus inorganic polymeric complex is prepared as follows. Initially, 353.1 g of cobalt metal are placed into the reaction vessel, and thereafter, 267.2 ml of $H_3PO_4$, previously mixed with sufficient water to produce an 85% by weight concentrated solution, are introduced into the reaction vessel. The cobalt metal reacts slowly with the $H_3PO_4$ solution. Next, 5 g of sodium hydroxide, in the form of solid pellets, are metered slowly into the reaction vessel along with 100 ml of water. It is observed that after the reaction has remained undisturbed for 13 days, the color of the reaction solution is deep pink. After the reaction has continued for twenty-six days, heat is applied to the reaction vessel to raise the temperature of the reaction solution to 95° C. The color of the reaction solution at this time is deep purple. A polymer is formed in this example.

EXAMPLE 10

Figure 8:
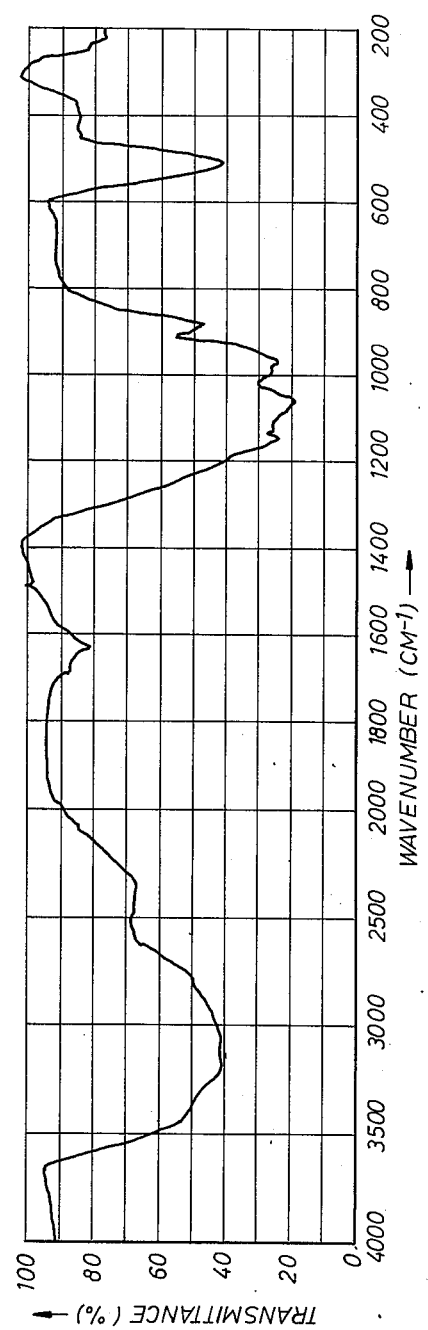
FIG. 8 is an infra-red scan of a manganese-sodium-phosphorus polymeric complex produced by the practice of the present invention.

In order to form a manganese-sodium-phosphorus inorganic polymer, 296.9 g of manganese metal are placed in a reaction vessel containing 267.2 ml of $H_3PO_4$, 85% concentration. The manganese begins immediately to react vigorously with the phosphoric acid. The reaction mixture is diluted with some 350 ml of water, and thereafter, some 40 g of sodium hydroxide in the form of solid pellets are metered into the reaction solution. After the sodium hydroxide addition has begun, some phosphoric acid is also metered into the reaction. At this point, the reaction is bubbling slowly. It is left undisturbed for 13 days and is then terminated by removing the unreacted manganese metal. Analysis shows that 104.4 g of manganese metal were consumed in the reaction. A sample of the viscous solution is then taken and dried to form a film, which is the analyzed by infra-red scan. Referring to FIG. 8, one notes unique structure of the product formed, including the presense of pH groups.

Following the procedure of the foregoing examples, inorganic polymeric complexes were successfully found employing zinc, beryllium and tellurium, respectively, with sodium hydorxide and phosphoric acid.

EXAMPLE 11

422.1 g of zone refined, high purity silicon, in the form of chunks, were placed at the bottom of a reaction vessel and 800 g of deionized water added. 200 g of sodium hydroxide pellets were added to the solution and permitted to dissolve. The pH was measured at above 13. The reaction vessel was placed on a heating plate and slowly heated to a temperature of 53° C. At this point, a slow feed, drop-by-drop, of 85% phosphoric acid was added to the reaction vessel. This slow feed was so continued, with continued heating of the reaction and the pH of the reaction monitored. After approximately 2 hours, the temperature was 80° C and the pH 11.9. At this point, precipitate began to form at the bottom of the reaction vessel and the phosphoric acid feed was stopped. The reaction was allowed to proceed with additional heat for 5 more hours, at which time the temperature was 100° C and the pH 10.2. The heat was turned off and the reaction vessel was allowed to cool down overnight. The next morning the pH of the reaction medium was measured at 11.3. The heat was turned on and the reaction continued for 8 more hours. At several intervals during the day, additional phosphoric acid was metered slowly into the reaction medium. The heat was turned off and the reaction again allowed to cool down overnight. The following morning, the pH of the reaction was measured to be 10.8. The unreacted silicon was removed from the reaction medium and measured to be 353.7 g. A very viscous, transparent solution remained in the reaction vessel. Infrared analysis confirmed the presence of PH groups in the product.

EXAMPLE 12

In this example, low purity silicon (96.3%) was utilized in the place of the high purity silicon of the previous example. The reaction sequence was the same, except that in this example, 15% by weight of sodium hydroxide solution was utilized and the reaction began at a lower temperature. The starting temperature was 28° C and the starting pH was 13.7. The reaction proceeded very slowly, however, and it became necessary to stop the acid feed and heat the reaction slightly to increase the rate of dissolution of the silicon. The heat was turned off and feed resumed 5 minutes later. After another hour, the phosphoric acid feed was stopped. The temperature was approximately 50° C and the pH 13.2. The reaction continued to proceed for another thirty minutes, and as it did so, the temperature slowly increased. At approximately 95° C, a very violent exothermic reaction developed, at which point the remaining phosphoric acid was added. This brought the pH down and also noticeably decreased the reaction rate. In addition, it seemed that some silicon precipitated out of solution. The reaction was allowed to continue to cool down for some four hours, at which point the temperature measured 43° C. At this point, the heat was turned on and the reaction slightly heated for another two hours. The pH was measured to be 10.5 and the reaction temperature at 58° C. The following morning a very thick viscous material was in the reaction vessel. 200 cc of water had to be added in order to dilute the solution so as to remove the measure the unreacted silicon. This measurement determined that approximately 90 g of silicon had been taken up by the polymer. The amount of phosphoric acid utilized (85% by weight) was approximately While the present invention has been described primarily with regard to the foregoing specific exemplification, particularly in connection with the preferred embodiments of the present invention, it should be understood that the present invention cannot under any circumstances be deemed limited thereto, but rather, must be construed as broadly as any and all equivalents thereof. For example, as indicated above, the present invention can make use of a plurality of non-alkaline metals to produce the inorganic polymeric complex and more than one reaction sequence is available to obtain the reaction between the non-alkaline metal or metals, alkali metal hydroxide and source of PH groups. Accordingly, all of the foregoing must be construed to fall within the scope of the invention disclosed and claimed herein.

What is claimed is:

1. A method of producing an inorganic multi-metal polymeric complex containing a plurality of hydrophosphide groups which comprises:
reacting in an aqueous medium at a temperature of about 40° C to about 100° C
 (a) at least one non-alkaline metal selected from Groups I-VIII of the Periodic Table;
 (b) an alkali metal hydroxide; and
 (c) a phosphorus-containing compound capable of conversion to hydrophosphide groups under the conditions prevailing in the aqueous reaction medium according to the following:
 (i) introducing a predetermined quantity of said non-alkaline metal into a reaction vessel containing said aqueous medium;
 (ii) providing in said aqueous medium a supply of alkali metal hydroxide to achieve a highly alkaline pH in said aqueous medium;
 (iii) incrementally introducing said phosphorus-containing compound into said aqueous medium, whereby hydrophosphide groups are formed which react with dissolved metal ions of said non-alkaline metal and alkali metal, the rate of introduction of said phosphorus-containing compound corresponding approximately proportionately to the rate of dissolution of the non-alkaline metal;
 (iv) stopping the incremental introduction of said phosphorus-containing compound when the pH of said aqueous medium is reduced to a pH of about 8.5 to about 10.5, such reduction in pH being indicative of organic polymeric complex production; and
 (v) thereafter terminating the reaction by removing from the aqueous medium any unreacted non-alkaline metal.

2. The method of claim 1 wherein said phosphorus-containing compound is an aqueous solution of $H_3PO_4$.

3. The method of claim 2 wherein said phosphorus-containing compound is concentrated $H_3PO_4$.

4. The method of claim 1 wherein said non-alkaline metal is aluminum.

5. The method of claim 1 wherein said non-alkaline metal is silicon.

6. The method of claim 1 wherein said alkali metal hydroxide is selected from sodium hydroxide and potassium hydroxide.

7. The method of claim 1 wherein additional alkali metal hydroxide is metered into the reaction medium essentially simultaneously with the addition of the phosphorus-containing compound.

8. The inorganic polymeric complex prepared by the method of claim 1.

9. A method of producing an inorganic polymeric complex containing a plurality of hydrophosphide groups which comprises: reacting in an aqueous medium
 (a) at least one non-alkaline metal selected from Groups I-VIII of the Periodic Table;
 (b) an alkali metal hydroxide; and
 (c) a phosphorus-containing compound capable of conversion to hydrophosphide groups under the conditions prevailing in the aqueous reaction medium according to the following:
 (i) introducing a predetermined quantity of said non-alkaline metal into a reaction vessel containing said aqueous medium;
 (ii) providing in said aqueous medium a supply of said hosphorus-containing compound and a highly acidic pH;
 (iii) incrementally adding to said acidic aqueous medium a supply of alkali metal hydroxide, whereby hydrophosphide groups are formed which react with dissolved metal ions of said non-alkaline metal and alkali metal, the rate of introduction of said alkali metal hydroxide corresponding approximately proportionately to the rate of dissolution of the non-alkaline metal;
 (iv) stopping the incremental introduction of said supply of alkali metal hydroxide when the pH of said aqueous medium reaches a pH above about 3.5 to about 6.0; and thereafter,
 (v) removing from the aqueous medium any unreacted non-alkaline metal.

10. The method of claim 9 wherein said phosphorus-containing compound is an aqueous solution of $H_3PO_4$.

11. The method of claim 10 wherein said phosphorus-containing compound is concentrated $H_3PO_4$.

12. The method of claim 9 wherein said aqueous medium is heated to a temperature of from about 50° C to about 300° C during the reaction.

13. The method of claim 12 wherein the reaction is initiated at a temperature between about 50° C to about 300° C and thereafter continuously heated during the reaction sequence.

14. The method of claim 9 wherein said non-alkaline metal is silicon.

15. The method of claim 9 wherein said non-alakline metal is aluminum.

16. The method of claim 9 wherein said alkali metal hydroxide is selected from sodium hydroxide and potassium hydroxide.

17. The inorganic polymeric complex prepared by the method of claim 9.

* * * * *